Jan. 21, 1930. H. E. CHRISTIE ET AL 1,744,447
INDICATOR FOR THE COOLING SYSTEMS OF AUTOMOBILES
Filed April 30, 1927
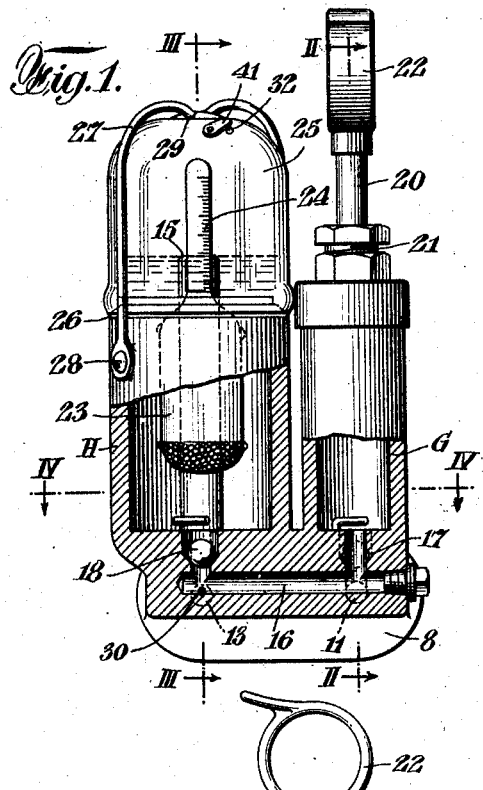
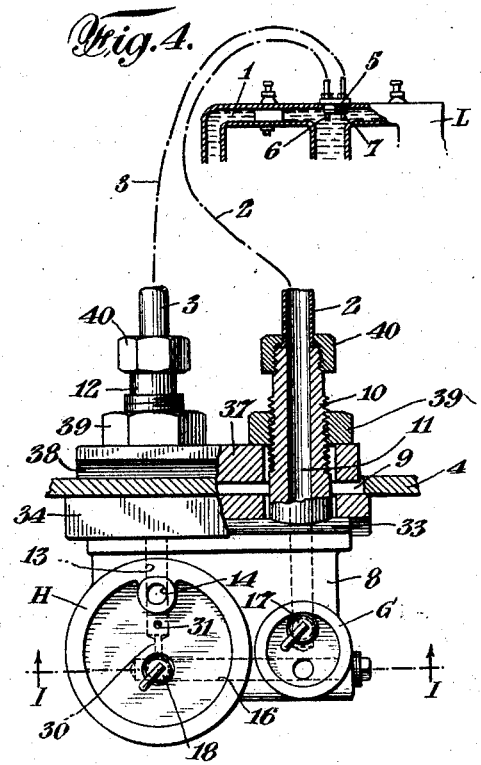
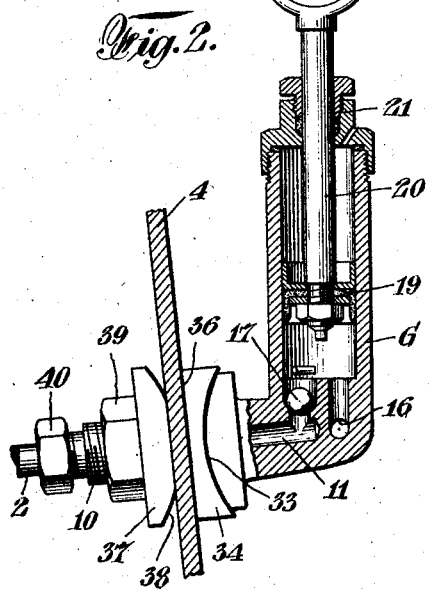
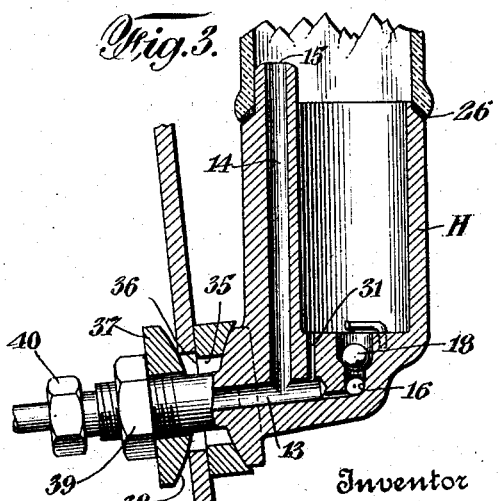

Patented Jan. 21, 1930

1,744,447

UNITED STATES PATENT OFFICE

HOWARD E. CHRISTIE AND KIBBEY W. COUSE, OF BRONX, NEW YORK

INDICATOR FOR THE COOLING SYSTEMS OF AUTOMOBILES

Application filed April 30, 1927. Serial No. 187,748.

This invention relates to an indicator for the cooling system of an automobile or the like where water cooled motors are employed, the present invention being in the nature of an improvement upon the structures shown and described in our pending application Serial Number 122,783, filed July 16, 1926.

An object of the present improvement is to provide an indicator device of the kind referred to and which includes indicator means adapted to be located upon the instrument board of the automobile or the like.

A more specific object is to provide an indicator device having indicator means located at the instrument board of the automobile and adapted to show to the automobile driver at a glance the extent to which the cooling fluid of the automobile engine is immune from freezing.

A further specific object is to provide means whereby the fluid to be tested may be quickly and easily drawn from the engine to the instrument board, and whereby the fluid may readily return to the engine after the test has been taken, thus leaving the parts of the device at the instrument board free and clean of any of the fluid.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which we have shown merely a preferred form of embodiment of the invention:—

Fig. 1 is a front elevational view, partly in section, of an indicator device constructed in accordance with this invention.

Fig. 2 is a vertical transverse sectional view taken substantially upon the plane of line II—II of Fig. 1.

Fig. 3 is a vertical transverse sectional view taken substantially upon the plane of line III—III of Fig 1, and Fig. 4 is a horizontal sectional view taken substantially upon the plane of line IV—IV of Fig. 1 and indicate diagrammatically the manner in which the indicator device parts upon the instrument board are connected with the water jacket of an automobile or like engine.

Referring to the drawings for describing in detail the structure which is illustrated therein, the reference character L indicates a part of an ordinary automobile engine having the water jacket 1 thereon for containing the cooling fluid in the usual manner.

From the interior of the water jacket 1 two separate lines of pipe, as 2 and 3, extend to the instrument board 4 of the automobile or the like, being there connected with pump and float cylinders G and H respectively.

The manner in which the pipes 2 and 3 are placed in communication with the interior of the water jacket of the engine may take any appropriate form but for convenience of illustration is here shown to comprise a single screw plug as 5 having two separate ducts as 6 and 7 therethrough, the duct 6 being connected with pipe 2 and the duct 7 being connected with pipe 3.

The point at which the pipes 2 and 3 are connected with the water jacket 1 is at a level below the level of the instrument board 4 and the cylinders G and H, the instrument board and cylinders being in fact necessarily in a horizontal plane above the level of the cooling fluid in the engine cooling system, including the radiator thereof, so that fluid will not normally move through the pipes 2 and 3 to either of the cylinders G or H, and so that any fluid within the cylinders will tend to move backwardly by gravity along the pipes to the bulk of fluid in the cooling system.

The cylinders G and H may be constructed in any appropriate manner but for purpose of illustration are here shown as being formed as integral parts of a single metallic casting, said casting including a base portion 8 also integral therewith from which the cylinders rise vertically side by side preferably in a substantially common plane parallel with the face of the instrument board 4.

Extending rearwardly from the base 8 through a suitable opening 9 provided in the instrument board is a threaded extension 10 to the rear end of which the pipe 2 is attached, said extension being formed with a bore 11 longitudinally therethrough extending into the base and communicating with the bottom end of the pump cylinder G.

Extending rearwardly from the base 8, also through the opening 9, is a second threaded extension 12 to the rear end of which the pipe 3 is attached. This extension is formed with a bore 13 longitudinally therethrough extending into the base and continuing through a tube-like portion as 14 within the float cylinder H where it opens into said cylinder at a suitably elevated point as at 15.

Communicating between the bottoms of the cylinders G and H is a passage-way 16.

The bore 11 by which the pipe 2 communicates with the pump cylinder is guarded by a check valve represented by the gravity ball 17 arranged therein to permit movement of fluid through the bore and into the pump cylinder but to prevent return movement of the fluid, and the passage-way 16 is guarded by a check valve represented by the gravity ball 18 arranged therein to permit movement of fluid through the passage-way and into the float cylinder but to prevent return movement of the fluid.

Within the pump cylinder is arranged a piston head 19 connected with a piston rod 20 which extends upwardly through a suitable stuffing box 21 at the upper end of the cylinder and which is provided with a finger grip as 22 at its upper end above the cylinder.

By reciprocating the head 19 within its cylinder fluid will be drawn into the cylinder from tube or pipe 2 with each upward movement of the head and forced out of the cylinder through passage-way 16 and into the float cylinder with each downward movement of the head, and a few such reciprocatory movements will quickly fill the float cylinder to a point where further fluid pumped thereinto will overflow into the upper end opening 15 of the tube or pipe 3, and back to the engine, the position of the end opening 15 thus establishing a level above which the fluid can not ordinarily be moved by the pump.

Within the float cylinder is a suitable hydrometer float 23 which, when fluid is present within said cylinder, will float at a level dependent upon the specific gravity of the fluid. The float 23 is preferably provided with suitable indicating marks upon its stem portion as at 24 which are intended to be read by the observer at the level of the fluid for thereby determining the specific gravity of the fluid from which he is able also to readily determine whether or not the fluid is immune to freezing, and to what degree, if any, more or less alcohol or other anti-freezing material should be introduced into the fluid.

In order that the level of the fluid may be conveniently seen by the observer in taking his reading, or test, the upper part of the float cylinder is preferably formed of glass or other transparent material, and to this end the drawing illustrates a glass dome-shaped member 25 comprising the upper portion of the float cylinder and having a water tight connection as at 26 with the lower or metallic portion of said cylinder, the tube portion 14 being extended upwardly within the dome 25 so that the opening 15 thereof will establish a water level sufficiently elevated within the dome to make reading of the hydrometer easy and convenient.

In order that the interior of the dome, and the surface of the hydrometer float, may be wiped off and cleaned at necessary intervals, the dome is preferably made readily detachable, and to this end the drawing illustrates a spring yoke as 27 pivotally connected with the lower or metallic portion of the cylinder as at 28 and adapted to straddle over the upper end of the dome and exert a spring pressure downwardly against the dome in the same manner as is well known in fruit jar construction, it being simply necessary to snap the yoke out of a notch as 29 at the upper end of the dome and swing the yoke to one side in order to enable the dome to be lifted off at will, the return of the yoke into snapped engagement with the notch 29 after the dome has been returned being all that is necessary to hold the dome sealed in position.

After a reading has been taken it is desirable that the fluid within the cylinders should flow therefrom back to the main bulk of fluid in the cooling system in order that when a subsequent reading is taken an entirely new supply of fluid, fresh from the main bulk, will be quickly available, as well as to prevent the formation of sediment deposits within the cylinders. To this end a small by-pass as 30 is provided communicating between the bore 13 and the passage-way 16 so that any fluid which is within the pump cylinder may dribble outwardly therefrom by means of the passage-way 16 and bypass 30 back to the main bulk by way of bore 13 and tube or pipe 3. Also a second small by-pass as 31 is provided communicating directly between the bore 13 and the bottom end of the float cylinder so that any fluid which is within the float cylinder may dribble outwardly therefrom by means of the bore 13 and tube or pipe 3 back to the main bulk.

A suitable vent as 32 is provided through the upper portion of dome 25 to facilitate the rise and fall of fluid within the float cylinder.

Since it is desirable that in order to secure proper floating conditions for the hydrometer 23 the float cylinder should be substantially vertical at all times, and since the instrument boards of various automobiles or other devices to which the instrument may be attached are disposed at different angles, it is proposed that the extensions 10 and 12 which extend through the instrument board shall be fitted with suitable universal connections whereby the base 8 may be connected in adjusted relationship to the instrument board and thus enable the float cylinder to be always adjusted and fixed in a vertical position irrespective of the angle of inclination of the instrument board. For this purpose the drawing shows the base 8 to be provided with a convexed rear surface 33 against which rests a washer or plate 34. This washer has a concaved forward face resting against the convexed surface 33. Openings of suitable size as indicated at 35 are provided for permitting passage of the extensions through this washer or plate and for permitting appreciable up and down movement of said plate. The rear surface as at 36 is made flat to rest against the flat forward face of the instrument board. The opening 9 provided through the instrument board has sufficient vertical width to permit an appreciable amount of vertical play of the extensions while adjustment is being effected. Rearwardly of the instrument board the extensions carry a second washer or plate as 37. This element has its forward face as 38 convexed and the openings as 39 therethrough for receiving the extensions are enlarged to permit a vertical movement of the element with respect to the extensions during the adjustment. Rearwardly of the element or plate 37 are lock nuts 39 threaded upon the extensions by which the washers or plates 34 and 37 may be clamped against the interposed instrument board in any position of adjustment to which the extensions are placed.

Beyond the nuts 39 the extensions may be formed with threaded reduced parts for receiving the clamp nuts 40 by means of which the pipes or tubes 2 and 3 are attached thereto.

While it has hereinabove been suggested that the indicating device comprising this invention, and particularly the float by hydrometer cylinder thereof should be located in a plane above the level of the fluid in the motor cooling system, it nevertheless sometimes occurs, as for instance when a vehicle is ascending a steep grade, that the level of the fluid in the cooling system of the motor may rise relatively above even the top end of the float or hydrometer cylinder. On this account it is desirable that the vent opening 32 at the upper end of the hydrometer cylinder should be provided with manually operable or automatically operable guard means to prevent discharge of any of the fluid therefrom. For this purpose the drawing illustrates, as an example of such means, a pivotally mounted shutter as 41 arranged so that in emergency, or otherwise, the driver may close the vent opening therewith.

It may be here pointed out that since the operation of the pump is such as to force fluid into the float or hydrometer cylinder by manual pressure, and since any air contained within the hydrometer cylinder could thus be forced out through the opening 15 and tube 3 back to and through the motor cooling system, the vent opening 32 may be omitted entirely if preferred. After a reading has been taken the small amount of fluid which is contained within the hydrometer cylinder will dribble back to the main bulk as already described, the necessary air for replacing the fluid being in this instance supplied through the motor cooling system by means of the tube 3, and opening 15.

As many changes could be made in this construction without departing from the scope of the invention, as defined in the following claims, it is intended that all matter contained in the above description or shown in the accompanying drawings, shall be interpreted as illustrative only and not in a limiting sense.

Having thus described our invention, what we claim as new and desire to secure by Letters Patent is:—

1. An indicator device for the cooling system of motors, said indicator device comprising a cylinder adapted to contain a hydrometer float therein, a hydrometer float within said cylinder, means whereby fluid from the cooling system of the motor may be introduced into the cylinder to float the hydrometer, said cylinder being formed partly of metal and partly of transparent glass, the glass part consisting of a dome-shaped member comprising the upper portion of the cylinder, together with means whereby said glass dome-shaped member may be attached and removed at will.

2. An indicator device for the cooling system of motors, said device comprising a base portion having a pair of cylinders projecting upwardly therefrom, a piston movable in one of said cylinders, a hydrometer in the other cylinder, there being a passage-way formed in said base communicating between the two cylinders, a valve controlling said passage-way, a tube communicating between the piston cylinder and the cooling system of the motor, a valve controlling said tube, all whereby movement of the mentioned piston will cause cooling fluid to be moved from the cooling system through said base into the hydrometer cylinder, and attaching means by which to connect the base to a suitable support said attaching means comprising a threaded extension of said base adapted to extend through an opening in the support and having means carried thereby engaging the support of a character enabling adjustment of the base with respect to the support for retaining the hydrometer cylinder in a desirable position to facilitate proper operation of the hydrometer therein.

3. An indicator device for the cooling system of motors, said device comprising a base portion having a pair of cylinders projecting upwardly therefrom, a piston movable in one of said cylinders, a hydrometer in the other cylinder, there being a passage-way formed in said base communicating between the two cylinders, a valve controlling said passage-way, a tube communicating between the piston cylinder and the cooling system of the motor, a valve controlling said tube, all whereby movement of the mentioned piston will cause cooling fluid to be moved from the cooling system through said base into the hydrometer cylinder, and attaching means by which to connect the base to a suitable support said attaching means comprising a threaded extension of said base adapted to extend through an opening in the support and having means carried thereby engaging the support of a character enabling adjustment of the base with respect to the support for retaining the hydrometer cylinder in a desirable position to facilitate proper operation of the hydrometer therein, together with means providing an overflow from the hydrometer cylinder comprising parts of a character to assist in attaching the base to said support.

4. An indicator device for the cooling system of motors, said indicator device comprising a cylinder adapted to contain a hydrometer float therein, a hydrometer float within said cylinder, means whereby fluid from the cooling system of the motor may be introduced into the cylinder to float the hydrometer, said cylinder being formed partly of metal and partly of transparent glass, the glass part consisting of a dome-shaped member comprising the upper portion of the cylinder, means whereby to establish a level of fluid at a point within said glass part, and means to seal the joint between the glass part and the metal part.

5. An indicator device for the cooling system of motors, said indicator device comprising a cylinder adapted to contain a hydrometer float therein, a hydrometer float within said cylinder, means whereby fluid from the cooling system of the motor may be introduced into the cylinder to float the hydrometer, said cylinder being formed partly of metal and partly of transparent glass, the glass part consisting of a dome-shaped member comprising the upper portion of the cylinder, together with a yoke pivotally connected with the metal part and engaging the glass part to removably retain the glass part against displacement.

6. An indicator device for the cooling system of motors, said device comprising a base portion having a hydrometer cylinder provided therein, a hydrometer within said cylinder, said cylinder having a part through which the hydrometer is visible from without the cylinder, an attaching part provided upon the base portion by which to attach said base portion to a suitable support, means by which to connect said attaching part with the cooling system of a motor, said means and said part being formed to provide a passage-way continuously therethrough between said cooling system and the interior of the hydrometer cylinder, and means by which to cause movement of cooling fluid from the motor along said passage-way and into the hydrometer cylinder.

7. An indicator device for the cooling system of motors, said device comprising a base portion having a hydrometer cylinder provided thereon, a hydrometer within said cylinder, said cylinder having a part through which the hydrometer is visible from without the cylinder, an attaching part provided upon the base portion by which to attach said base portion to a suitable support, means by which to connect said attaching part with the cooling system of a motor, said means and said part being formed to provide two separate passage-ways continuously therethrough between said cooling system and the interior of the hydrometer cylinder, and means by which to cause movement of the cooling fluid from the motor along one of said passage-ways and into the hydrometer cylinder, together with means whereby the second passage-way is adapted to constitute a fluid return to the cooling system.

8. An indicator device for the cooling system of motors, said device comprising a base portion having a hydrometer cylinder provided thereon, a hydrometer within said cylinder, said cylinder having a part through which the hydrometer is visible from without the cylinder, an attaching part provided upon the base portion by which to attach said base portion to a suitable support, said attaching part comprising a threaded extension of said base arranged to extend loosely through an opening in the support, means carried by said extension providing a convexed surface arranged to engage the walls of the opening in the support whereby to permit adjustment of the indicator device into the vertical position necessary to facilitate proper operation of the hydrometer within said cylinder, means threaded upon said extension of a character to clamp the last mentioned part against the support for thereby retaining the indicator device in the mentioned vertical position, means by which to connect said threaded extension with the cooling system of a motor, said last means and said extension being formed to provide a passage-way continuously therethrough between said cooling system and the interior of the hydrometer cylinder, and means by which to cause movement of cooling fluid from the motor along said passage-way and into the hydrometer cylinder.

In testimony whereof we affix our signatures.

HOWARD E. CHRISTIE.
KIBBEY W. COUSE.